United States Patent [19]
Matsushima

[11] Patent Number: 5,615,551
[45] Date of Patent: Apr. 1, 1997

[54] FUEL CONTROL SYSTEM

[75] Inventor: Hideyuki Matsushima, Isehara, Japan

[73] Assignee: Nissan Motor Co., Ltd., Kanagawa, Japan

[21] Appl. No.: 528,272

[22] Filed: Sep. 14, 1995

[30] Foreign Application Priority Data

Sep. 19, 1994 [JP] Japan ................................. 6-223043

[51] Int. Cl.⁶ .................................................. F01N 3/28
[52] U.S. Cl. ...................... 60/276; 60/299; 180/89.2; 180/309
[58] Field of Search ......................... 60/276, 309, 299; 180/69.1, 89.2, 309

[56] References Cited

U.S. PATENT DOCUMENTS

| | | | |
|---|---|---|---|
| 4,111,778 | 9/1978 | Davis | 60/276 |
| 4,130,095 | 12/1978 | Bowler et al. | |
| 4,349,078 | 9/1982 | Shimada | 60/299 |
| 4,484,440 | 11/1984 | Oki et al. | 60/276 |
| 4,617,795 | 10/1986 | Abthoff | 60/276 |
| 5,018,348 | 5/1991 | Dürschmidt et al. | |
| 5,056,308 | 10/1991 | Kumi | 60/276 |
| 5,360,081 | 11/1994 | Takegami | 60/276 |

FOREIGN PATENT DOCUMENTS

| | | |
|---|---|---|
| 59-17854 | 2/1984 | Japan. |
| 2-136538 | 5/1990 | Japan. |
| 4-17758 | 1/1992 | Japan. |

*Primary Examiner*—Douglas Hart
*Attorney, Agent, or Firm*—Lowe, Price, LeBlanc & Becker

[57] ABSTRACT

In a vehicle, a floor has a lower side face. A tubular shell is disposed beneath the lower side face of the floor. The tubular shell defines an exhaust path and receives a catalyst module. An oxygen sensor includes a sensing element, a holder supporting the sensing element, and a protector covering the sensing element. The sensing element, holder and protector cooperate to define a space communicating with the exhaust path. The protector has a drain hole which is so disposed as to discharge water out of the space owing to gravity.

17 Claims, 4 Drawing Sheets

FUEL CONTROL SYSTEM

BACKGROUND OF THE INVENTION

The present invention relates to a fuel control system, and more particularly to an oxygen sensor used with a catalytic converter in a system for feedback control of an air/fuel ratio in the mixture supplied to an internal combustion engine of a vehicle.

There have been proposed air/fuel ratio feedback control systems detecting deterioration of catalytic converters by using oxygen sensors.

Japanese Patent Application First Publication No. 2-136538 discloses an air/fuel ratio feedback control system which includes an oxygen sensor disposed on a downstream side of a catalytic converter.

Japanese Patent Application First Publication No. 4-17758 discloses an air/fuel ratio feedback control system which includes oxygen sensors disposed on both upstream and downstream sides of a catalytic converter.

One example of prior art catalytic converters includes a tubular shell disposed beneath a floor of a vehicle. The tubular shell defines an exhaust path and receives a catalyst module. One example of conventional oxygen sensors includes a space communicating with the exhaust path and a sensing element within the space.

Japanese Utility Model Application First Publication No. 59-17854 discloses one example of such oxygen sensors.

SUMMARY OF THE INVENTION

An object of the present invention is to improve a performance of an oxygen sensor for use in an air/fuel ratio feedback control system for a vehicle.

According to one aspect of the present invention, there is provided an improved vehicle including a floor having a lower side face; a tubular shell disposed beneath the lower side face of the floor, the tubular shell defining an exhaust path and receiving a catalyst module; and an oxygen sensor including a space communicating with the exhaust path and a sensing element disposed adjacent the space; wherein the oxygen sensor has a drain hole so disposed as to discharge water out of the space owing to gravity.

According to further aspect of the present invention, there is provided a combination, in a vehicle, comprising: a floor having a lower side face; a tubular shell disposed beneath the lower side face of the floor, the tubular shell defining an exhaust path and receiving a catalyst module; and an oxygen sensor including a sensing element, a holder supporting the sensing element, and a protector covering the sensing element, the sensing element, the holder and the protector cooperating to define a space communicating with the exhaust path, the protector having a drain hole so disposed as to discharge water out of the space owing to gravity.

DESCRIPTION OF THE PREFERRED EMBODIMENT

Referring now to FIGS. 1 to 5, one preferred embodiment according to the invention is now explained.

Figure 1:
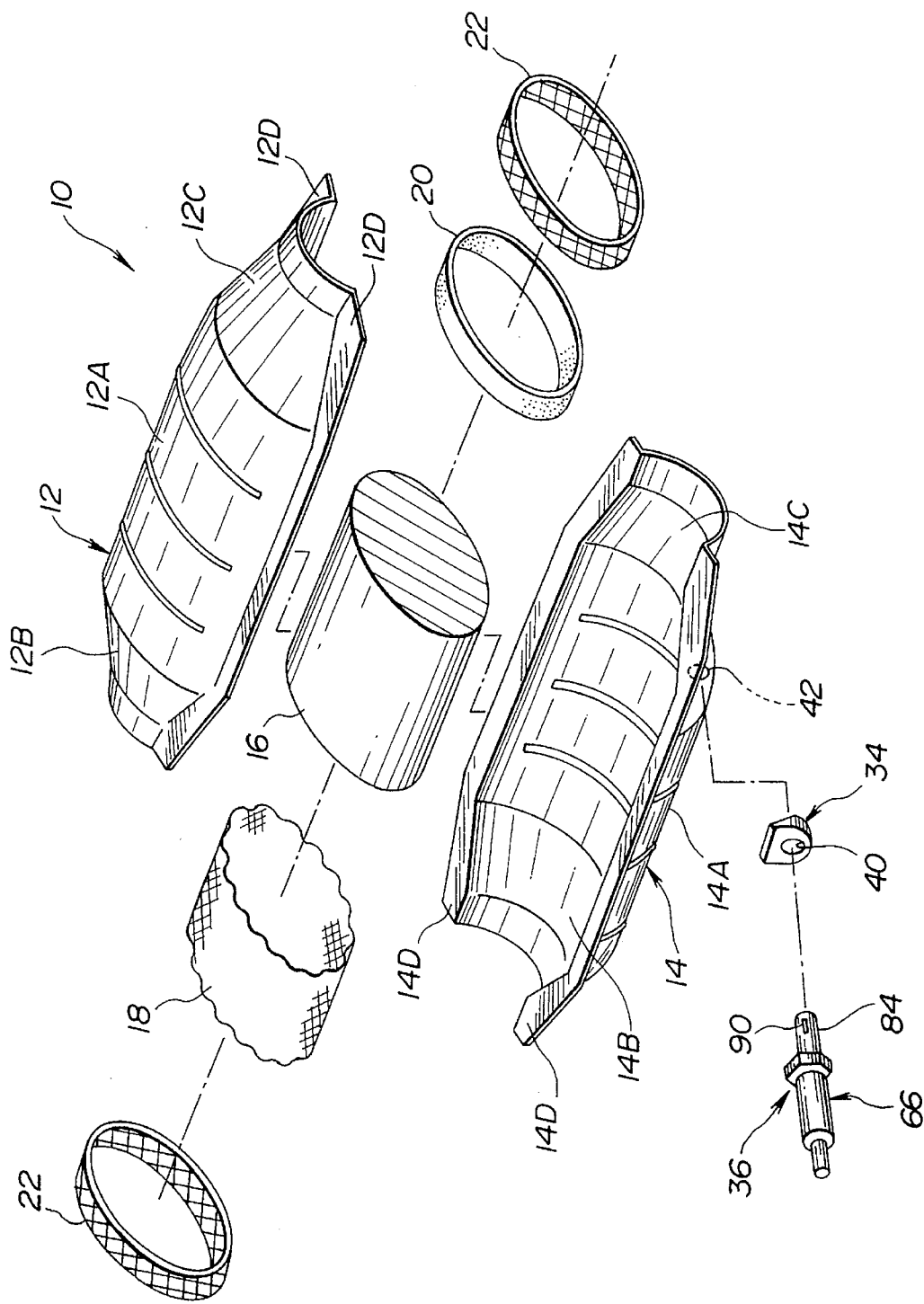
FIG. 1 is an exploded perspective view of a catalytic converter and an oxygen sensor for use in an air/fuel ratio feedback control system for an internal combustion engine of a vehicle, according to the present invention.
Figure 2:
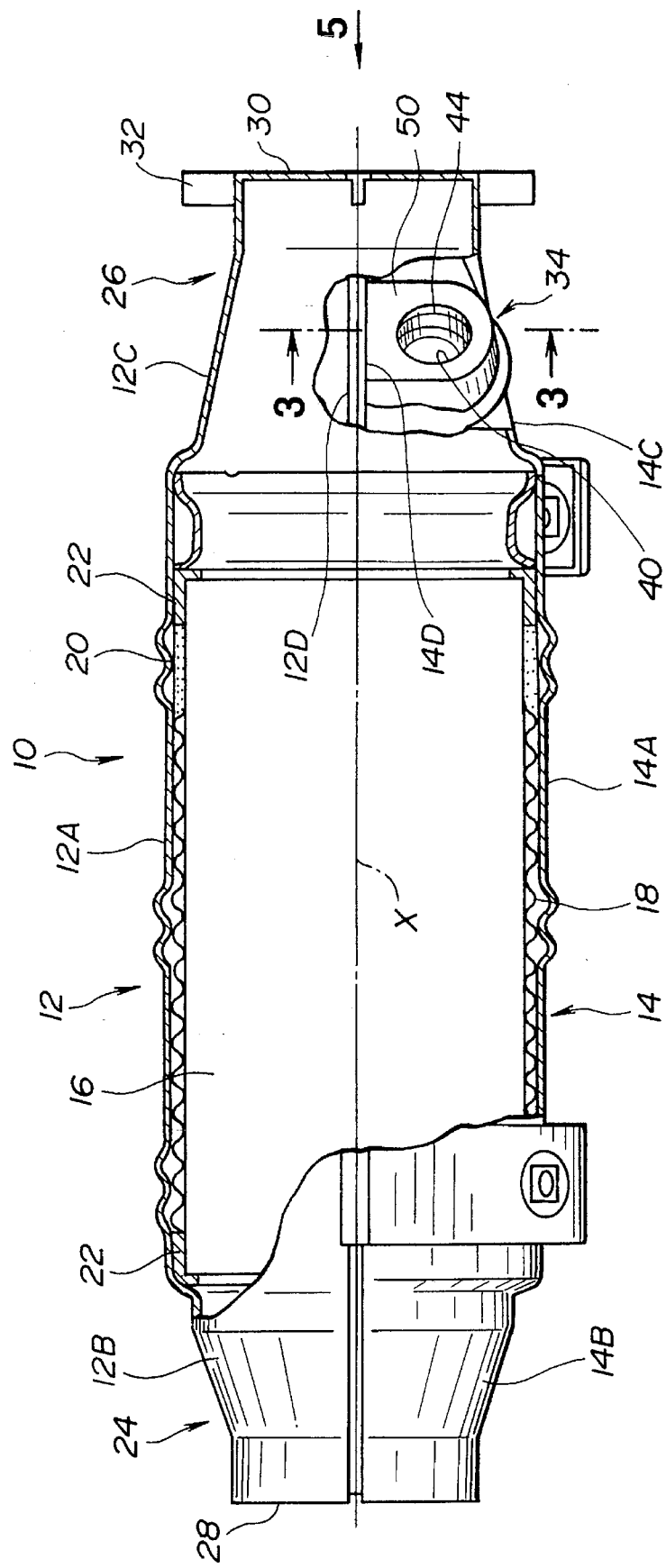
FIG. 2 is a schematic side view, partially in longitudinal sections, of the catalytic converter with a sensor support boss.

FIGS. 1 and 2 show a tubular shell 10 acting as a part of an exhaust system for an internal combustion engine of a vehicle. The tubular shell 10 includes an upper shell 12 and a lower shell 14 which form an integral shell body to define an exhaust path of exhaust gas emitted from the engine. The upper and lower shells 12 and 14 respectively have main portions 12A and 14A, tapered upstream-end portions 12B and 14B, tapered downstream-end portions 12C and 14C, and outward flanges 12D and 14D each extending longitudinally and projecting outwardly from a peripheral edge thereof. As illustrated in FIG. 2, the upper and lower shells 12 and 14 are coupled together at the outward flanges 12D and 14D. The main portions 12A and 14A form a container space having an ellipsoidal shape in cross section. A catalyst module 16 containing a catalyst is received in the container space together with a wire netting 18, a mat 20 and a washer 22. The catalyst module 16 is so designed as to abate carbon monoxide, hydrocarbons and nitrogen oxides from the exhaust gas in the exhaust path. The upstream-end portions 12B and 14B and downstream-end portions 12C and 14C form an inlet section 24 and an outlet section 26 which are of a generally frusto-conical shape. The inlet section 24 and the outlet section 26 are provided with a circular inlet 28 and a circular outlet 30, respectively. The circular inlet 28 has a greater diameter than the circular outlet 30. The tubular shell 10 is connected at the outlet 30 with an exhaust pipe (not shown) by means of a retainer 32. Thus, the tubular shell 10 serves as a housing of a catalytic converter. As illustrated in FIG. 2, the tubular shell 10 has an axis X lying in a plane L on which the outward flanges 12D and 14D of the upper and lower shells 12 and 14 mate with each other. The tubular shell 10 is so arranged that the plane L is in horizontal. Reference numerals 34 and 36 denote a sensor support boss fixed to the tubular shell 10 and an oxygen sensor supported by the sensor support boss, respectively.

Figure 3:
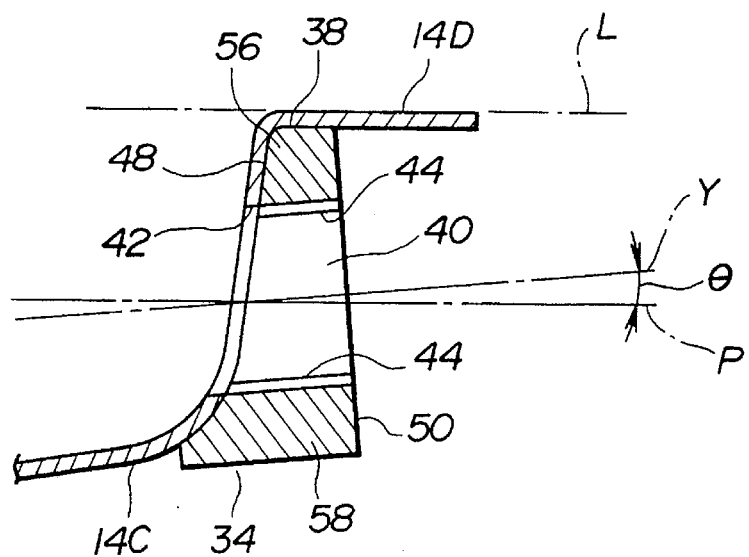
FIG. 3 is an enlarged sectional view, taken along line 3—3 of FIG. 2.
Figure 4:
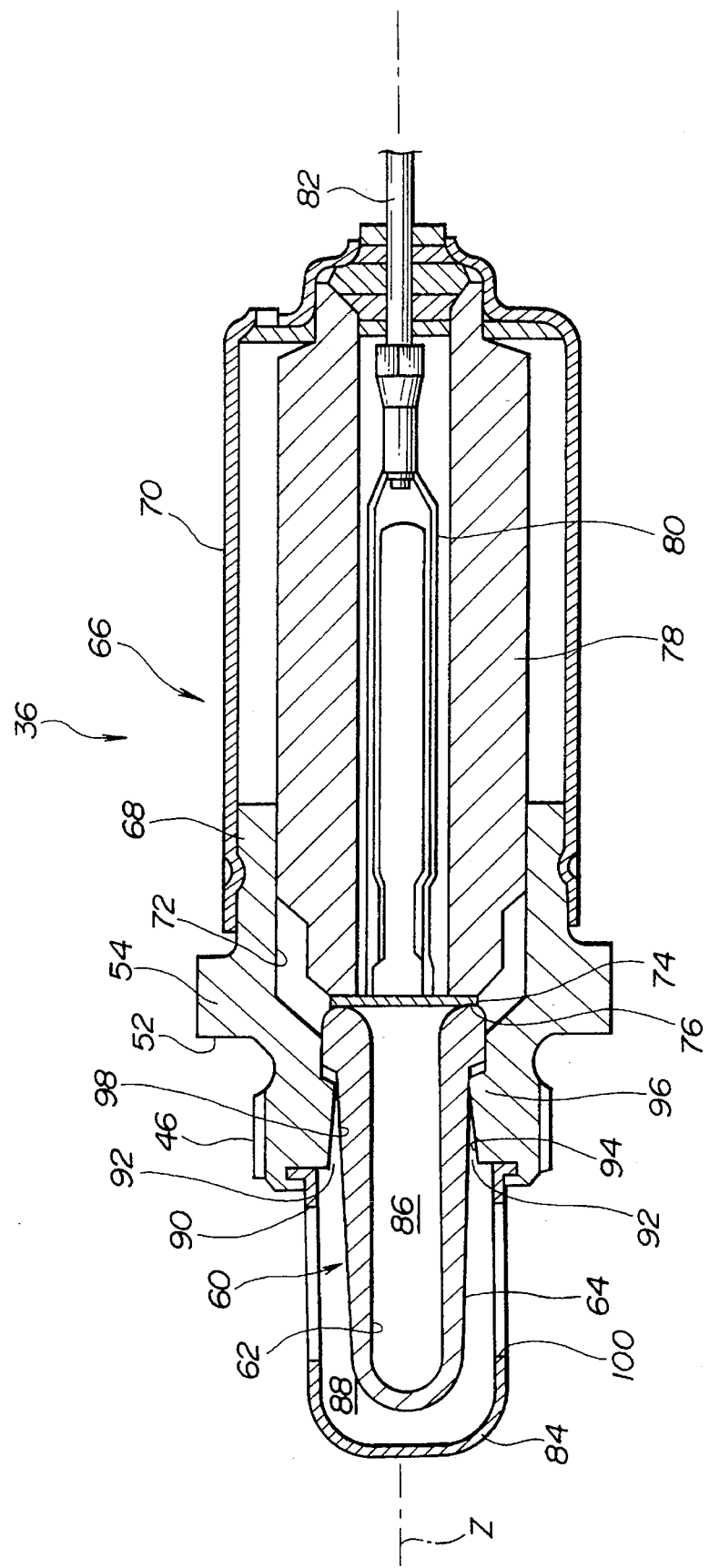
FIG. 4 is a longitudinal section of the oxygen sensor.

FIGS. 2 and 8 show the sensor support boss 34 which is made of metal and secured to the downstream-end portion 14C of the lower shell 14 of the tubular shell 10 by a suitable manner such as welding. As shown in FIG. 3, the sensor support boss 34 has an upmost end 38 contacted with a lower surface of the outward flange 14D disposed at an upper edge of the downstream-end portion 14C of the lower shell 14. The sensor support boss 34 has a cylindrical axial through bore 40 which has an axis Y and receives the oxygen sensor 36. The axial through bore 40 is so disposed as to be aligned with an opening 42 formed in the downstream-end portion 14C. An inner periphery of the axial through bore 40 of the sensor support boss 84 is formed with inner threads 44 engaged with outer threads 46 formed on an outer periphery of the oxygen sensor 36 as shown in FIG. 4. The sensor support boss 34 has one axial end 48 tapered to be flush with a sloped outer surface of the downstream-end portion 14C upon fitting, and an opposite axial end 50 contacted in face-to-face relation with a radial face 52 of a flange 54 which is formed on the oxygen sensor 36 as shown in FIG.

4. The opposite axial end 50 is disposed normal to the axis Y of the sensor support boss 34. As illustrated in FIG. 3, the sensor support boss 34 is so constructed that an axial length between the one end 48 and the opposite end 50 decreases toward the upmost end 38, viz. in an upward direction. Thus, the axial length at its lower portion 58 is greater than that at its upper portion 56. Reference character P denotes a plane parallel to the plane L, viz. a horizontal plane. The horizontal plane P contains a center of the opening 42. The axis Y of the sensor support boss 34 tilts with respect to the horizontal plane P at a predetermined angle θ as indicated in FIG. 3. The provision of the sensor support boss 34 serves for an easy and accurate positioning of the oxygen sensor Referring to FIG. 4, the oxygen sensor 36 will now be described. The oxygen sensor 36 is designed for use in the exhaust system for the internal combustion engine to detect concentration of oxygen in the exhaust gas and generate a signal indicative of the oxygen concentration for controlling an air/fuel ratio of the mixture to be supplied to the engine.

Figure 5:
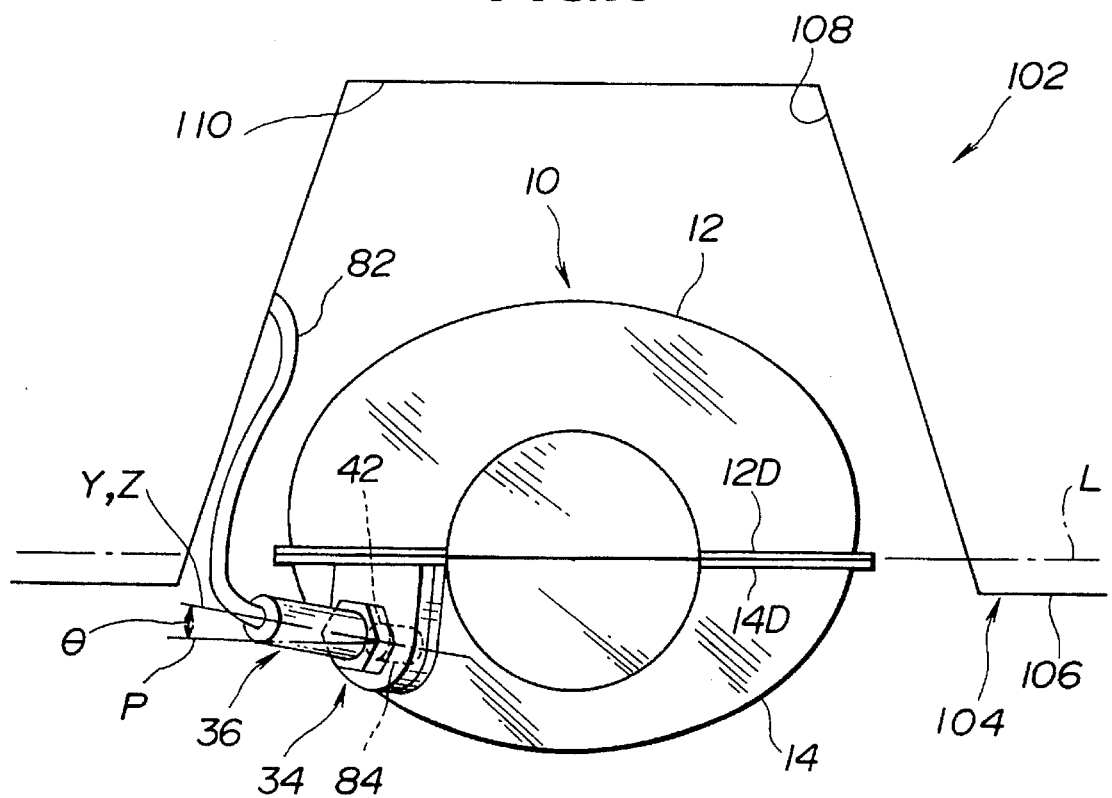
FIG. 5 is a downstream-side view of the catalytic converter in the direction of 5 in FIG. 2, showing the oxygen sensor supported on the catalytic converter and a vehicle floor disposed upward the catalytic converter.

As illustrated in FIG. 4, the oxygen sensor is of a generally cylindrical shape as a whole and has an axis Z. The oxygen sensor 36 includes a sensing element 60 in the form of a tube made of an oxygen ion conductive solid electrolyte including zirconia. The sensing element 60 has inner and outer thin electrode layers 62 and 64 provided by coating inner and outer surfaces thereof with a suitable material such as platinum. A generally cylindrical holder 66 supports the sensing element 60. The holder 66 includes a generally cylindrical metal plug 68 receiving the sensing element 60, and a tubular casing 70 receiving the plug 68. The plug 68 has an axial through hole 72 in which a contact plate 74 is disposed to be contacted at one hand with one axial end 76 of the sensing element 60 and at the other hand with both an insulating bushing 78 and a lead plate 80. The lead plate 80 is connected with a lead wire 82 transmitting an output signal generated from the sensing element 60 to a measurement circuit (not shown) in an air/fuel ratio control unit (not shown). A tubular protector 84 is supported on the plug 68 and covers the sensing element 60. Thus, the oxygen sensor 36 includes an inner space 86 defined by an inner surface of the sensing element 60 and the contact plate 74, and an outer space 88 defined by an outer surface of the sensing element 60, the plug 68, and the protector 84. Atmosphere used as reference gas is introduced into the inner space 86. When the oxygen sensor 36 is mounted on the tubular shell 10 through the sensor support boss 34 as shown in FIG. 5, the oxygen sensor 36 is inserted into the opening 42 of the downstream-end portion 14C of the lower shell 14. The sensing element 60 with the protector 84 projects from the opening 42 into the lower shell 14 to be disposed in the exhaust path. The outer space 88 communicates with the exhaust path by a plurality of apertures 90 provided in circumferentially and equi-distantly spaced relation on the protector 84. Each of the apertures 90 is in the form of slit and acts as an inlet permitting the exhaust gas to flow into the outer space 88. The outer space 88 includes a generally annular clearance 92 provided between a tapered inner circumferential surface 94 of a radially inwardly extending flange 96 formed on the plug 68, and an outer circumferential surface 98 of the sensing element 60 which is opposed to the tapered inner circumferential surface 94. The clearance 92 is of a "V" shape in axial cross section. The protector 84 has a drain hole 100 so disposed as to discharge water out of the outer space 88 including the clearance 92 owing to gravity when the oxygen sensor 36 is mounted on the tubular shell 10 as shown in FIG. 5. At least one of the apertures 90 serves as the drain hole 100. The drain hole 100 is located at a lower portion, as viewed in FIG. 4, of the protector 84. The water is generated resulting from an operation of the catalyst module 16 and condensation of water content in the exhaust gas when the exhaust pipe is heated to a relatively low temperature due to insufficient warming-up condition of the engine. The discharge of the water from the outer space 88 prevents generation of rust in the clearance 92 to thereby assure a good electrical connection between the sensing element 60 and the plug 68. Thus, an electric circuit of the oxygen sensor 36 is desirably protected from damage caused due to the rust generation, whereby an improved performance of the oxygen sensor 36 is provided. The configuration of the drain hole 100 is not limited to that of the aperture 90 of this embodiment as described above.

The oxygen sensor 36 is fixedly supported in the sensor support boss 34 by engagement of the outer threads 46 disposed on an outer circumferential surface of the plug 68 of the holder 66 with the inner threads 44 of the sensor support boss 34. Upon mounting, the oxygen sensor 36 is prevented from being excessively inserted into the inside of the lower shell 14 by abutting engagement between the radial face 52 of the radially outwardly extending flange 54 of the plug 68 and the opposite end 50 of tile sensor support boss 34.

FIG. 5 shows the oxygen sensor 36 mounted on the tubular shell 10 through the sensor support boss When the oxygen sensor 36 is placed in its mounting position as illustrated in FIG. 5, the axis Z of the oxygen sensor 36 is aligned with the axis Y of the sensor support boss 34 as shown in FIG. 3, and therefore the oxygen sensor 36 tilts at the predetermined angle with respect to the horizontal plane P. This tilting arrangement of the oxygen sensor 36 causes water entering the outer space 88 to be discharged therefrom through the drain hole 100 by gravity force. Further, the arrangement serves for preventing water from entering through the clearance 92 into the inner space 86 inside the sensing element 60. Thus, the oxygen sensor 36 can operate to generate a normal output signal.

As illustrated in FIG. 5, a floor 102 of the vehicle has a lower side face 104 beneath which the tubular shell 10 is disposed. The floor 102 has a base portion 106 and an upward recessed portion 108 connected with the base portion 106. The upward recessed portion 108 is concaved upwardly toward the inside of the vehicle body and has a bottom 110 which is located at a height level higher than the base portion 106. The upward recessed portion 108 receives the tubular shell 10 such that the upper shell 12 is spaced apart therefrom. The base portion 106 is located at a height level higher than the oxygen sensor 36 to avoid interference therewith. For this arrangement, the opening 42 of the lower shell 14 and the axial through bore 40 of the sensor support boss 34 are disposed at a suitable height level. The arrangement of the tubular shell 10 causes air heated due to the reacting operation of the catalyst module 16 to be collected within the space between the upper shell 12 and the recessed portion 108. The oxygen sensor 36 is disposed outside the space and therefore prevented from being subject to a direct exposure to the heated air. Thus, the oxygen sensor 36 can be operative without suffering from undesirable direct influence of the heated air. This leads to assuring a good performance of the oxygen sensor 36.

What is claimed is:

1. In a vehicle including:

a floor having a lower side face;

a tubular shell defining an exhaust path and receiving a catalyst module; and an oxygen sensor including a space communicating with said exhaust path, and a sensing element disposed adjacent said space;

the improvement comprising:

said tubular shell being disposed beneath said lower side face of said floor; and said oxygen sensor having a drain hole so disposed as to discharge water out of said space owing to gravity.

2. A vehicle comprising:

a floor having a lower side face;

a tubular shell disposed beneath said lower side face of said floor, said tubular shell defining an exhaust path and receiving a catalyst module; and an oxygen sensor including a sensing element, a holder supporting said sensing element, and a protector covering said sensing element, said sensing element, said holder and said protector cooperating to define a space communicating with said exhaust path, said protector having a drain hole so disposed as to discharge water out of said space owing to gravity.

3. The combination as claimed in claim 2, wherein said oxygen sensor tilts with respect to a horizontal plane of the vehicle.

4. The combination as claimed in claim 2, wherein said sensing element and said holder form a clearance therebetween which is a part of said space.

5. The combination as claimed in claim 2, further comprising a sensor support boss secured to said tubular shell, said sensor support boss including a through bore which is so disposed as to receive said oxygen sensor and support said oxygen sensor in tilting relation to a horizontal plane of the vehicle.

6. The combination as claimed in claim 5, wherein said through bore of said sensor support boss is aligned with an opening formed on said tubular shell, said sensing element together with said protector projecting from said opening into said tubular shell.

7. The combination as claimed in claim 2, wherein said floor has a base portion and an upward recessed portion connected with said base portion, said upward recessed portion having a bottom located at a height level higher than said base portion to receive said tubular shell, said base portion being located at a height level higher than said oxygen sensor.

8. The combination as claimed in claim 7, wherein said tubular shell includes an upper shell and a lower shell to form an integral shell body, said upper shell and said lower shell being coupled together on a horizontal plane of the vehicle, said upper shell being spaced downward apart from said upward recessed portion of said floor.

9. The combination as claimed in claim 3, wherein said tubular shell includes an upper shell and a lower shell to form an integral shell body, said upper shell and said lower shell being coupled together on said horizontal plane of the vehicle.

10. In a vehicle including:

a floor having base portion and an upward recessed portion located at a height level higher than said base portion;

a tubular shell disposed in said upward recessed portion of said floor to produce a first space therebetween, said tubular shell defining an exhaust path and receiving a catalyst module; and an oxygen sensor including a second space communicating with said exhaust path and a sensing element disposed adjacent said second space;

the improvement comprising:

said oxygen sensor having a drain hole so disposed as to discharge water out of said second space owing to gravity; and said oxygen sensor being disposed outside said first space and at a height level lower than said base portion of said floor.

11. A vehicle comprising:

a floor including a base portion and an upward recessed portion located at a height level higher than said base portion;

a tubular shell disposed in said upward recessed portion of said floor to produce a first space therebetween, said tubular shell defining an exhaust path and receiving a catalyst module;

an oxygen sensor including a sensing element, a holder supporting said sensing element, and a protector covering said sensing element, said sensing element, said holder and said protector cooperating to define a second space communicating with said exhaust path, said protector having a drain hole so disposed as to discharge water out of said second space owing to gravity; and said oxygen sensor being disposed outside said first space and at a height level lower than said base portion of said floor.

12. The combination as claimed in claim 11, wherein said oxygen sensor tilts with respect to a horizontal plane of the vehicle.

13. The combination as claimed in claim 11, wherein said sensing element and said holder form a clearance therebetween which is a part of said second space.

14. The combination as claimed in claim 11, further comprising a sensor support boss secured to said tubular shell, said sensor support boss including a through bore which is so disposed as to receive said oxygen sensor and support said oxygen sensor in tilting relation to a horizontal plane of the vehicle.

15. The combination as claimed in claim 14, wherein said through bore of said sensor support boss is aligned with an opening formed on said tubular shell, said sensing element together with said protector projecting from said opening into said tubular shell.

16. The combination as claimed in claim 11, wherein said tubular shell includes an upper shell and a lower shell to form an integral shell body, said upper shell and said lower shell being coupled together on a horizontal plane of the vehicle, said upper shell being spaced downward apart from said upward recessed portion of said floor.

17. The combination as claimed in claim 12, wherein said tubular shell includes an upper shell and a lower shell to form an integral shell body, said upper shell and said lower shell being coupled together on said horizontal plane of the vehicle.

* * * * *